United States Patent [19]

Gurbin

[11] 4,288,059
[45] Sep. 8, 1981

[54] SLUICE GATE

[76] Inventor: Florian Gurbin, 331 Irwin Ave., Essex, Ontario, Canada, N8M 2T7

[21] Appl. No.: 85,916

[22] Filed: Oct. 17, 1979

[51] Int. Cl.³ .......................................... F16K 31/122
[52] U.S. Cl. ....................................... 251/58; 251/62; 251/203; 251/231; 405/105; 405/106; 74/520
[58] Field of Search .................... 74/516, 520; 251/58, 251/62, 63, 231, 233, 203, 204, 279, 280, 326, 328; 405/104, 105, 106

[56] References Cited

U.S. PATENT DOCUMENTS

| | | | |
|---|---|---|---|
| 1,047,506 | 12/1912 | Dawson | 251/58 |
| 1,482,836 | 2/1924 | Brubaker et al. | 405/106 |
| 2,386,589 | 10/1945 | Caldwell | 251/58 |
| 2,487,185 | 11/1949 | Schofield | 251/62 |
| 2,490,555 | 12/1949 | Songer | 251/231 |
| 2,503,469 | 4/1950 | Caldwell | 251/58 |
| 2,643,521 | 6/1953 | Hatch | 405/106 |
| 4,028,896 | 6/1977 | Whipps | 251/203 |
| 4,070,863 | 1/1978 | Brown | 405/105 |

Primary Examiner—Martin P. Schwadron
Assistant Examiner—G. L. Walton

Attorney, Agent, or Firm—Michael M. Sakovich

[57] ABSTRACT

Apparatus for controlling fluid flow through a gate opening includes frame means that define the opening, and guide means which are adapted to retain a gate disc in slidable relation with the opening. Drawing means for laterally displacing the disc relative to the opening are pivotably connected to lever means having long and short ends. A fulcrum between the ends is pivotably connected to the disc. The short end is disposed to bear against a fixed portion of the guide means when the disc is closed, and the long end is connected to the drawing means to obtain a mechanical advantage in drawing pressure when displacing the disc to a partially open position. The lever means may be a single lever, but a preferred embodiment discloses a pair of levers to apply a uniform drawing pressure on the disc via a hydraulic cylinder that is anchored in a wall of a closed tank which contains the apparatus. A piston rod of the cylinder faces outwardly of the tank to avoid contamination and subsequent corrosion and is connected to the lever means by rods which are slidably sealed in passages leading through the wall.

7 Claims, 4 Drawing Figures

SLUICE GATE

BACKGROUND OF THE INVENTION

This invention relates to sluice gate apparatus and more particularly to sluice gate systems and improved apparatus that requires less energy for its operation.

A diversity of applications exist in the field of liquid flow control as between conduits, pipes or channels. Water flow control is perhaps the most typical of such applications requiring watertight closures that are widely used in water purification systems, sewage and drainage systems. In many cases high heads or pressures are encountered and in others corrosive environments are common which imposes a dual requirement on such apparatus. Not only must the sluice gate be a precision piece of equipment that can be used to form watertight closures but the gate must also be of heavy duty construction which can withstand the pressures and corrosive effects to which such apparatus is subjected.

In achieving the requirements of durability and strength, the structure of a sluice gate is necessarily heavy which often requires electric motor operated drawing means for opening and closing a gate. Furthermore, in order to comply with the requirements for a watertight seal, it is known to employ wedge means in order to jam a sluice gate disc against its frame. The combination of apparatus weight, wedge jamming pressure, and disc seating pressure caused by water pressure which tends to seat or push the disc against a mating seat face on the frame requires enormously high initial pressures in order to crack or unseat the disc so that it can be then raised. Once the disc is cracked, less energy is then required to lift it.

SUMMARY OF THE INVENTION

A principal object of the present invention is to provide an improved sluice gate system which requires less energy to crack the disc seal and thereby reducing the energy requirements of the system.

Another object of the invention is to provide an improved sluice gate system where the improvement is mechanically simple and structurally rugged to withstand severe operating environments.

Still another object of the invention is to provide a hydraulically operated sluice gate system using water hydraulics.

Yet another object of the invention is a sluice gate system in which a piston rod of hydraulic drawing means is disposed exteriorly of a closed chamber containing the sluice gate apparatus in a harsh and inhospitable environment.

The problems associated with the prior art may be substantially overcome and the foregoing objects achieved by recourse to the present invention which relates to an improvement in a sluice gate apparatus that includes drawing means energizable to operate the apparatus, a gate disc adapted to open and close a gate opening, frame means defining the gate opening, including guide means adapted to retain the disc in slidable relation with respect to the opening, and means connecting the disc with the drawing means for laterally displacing the disc relative to the opening when the drawing means are energized. The improvement comprises lever means having long and short ends and a fulcrum therebetween which is pivotably connected to the disc. The short end is disposed to bear against a fixed portion of at least one of the guide means and the frame means when the disc is in closed relation with the opening, and the long end is connected to the connecting means to obtain a mechanical advantage in drawing pressure when displacing the disc to a partially open position.

Another aspect of the invention relates to a sluice gate apparatus that includes drawing means energizable to operate the apparatus and which comprises, a gate disc adapted to open and close a gate opening, and frame means defining the gate opening, including guide means adapted to retain the disc in slidable relation with respect to the opening. The apparatus further comprises means connecting the disc with the drawing means for laterally displacing the disc relative to the opening when the drawing means are energized, and lever means having long and short ends and a fulcrum therebetween that is pivotably connected to the disc, the short end being disposed to bear against at least one of a fixed portion of the guide means and the frame means when the disc is in closed relation with the opening, and the long end being connected to the connecting means to obtain a mechanical advantage in drawing pressure when displacing the disc to a partially open position.

DESCRIPTION OF THE DRAWINGS

The invention will now be more particularly described with reference to embodiments thereof shown, by way of example, in the accompanying drawings in which.

DESCRIPTION OF THE ILLUSTRATED EMBODIMENTS

Figure 1:
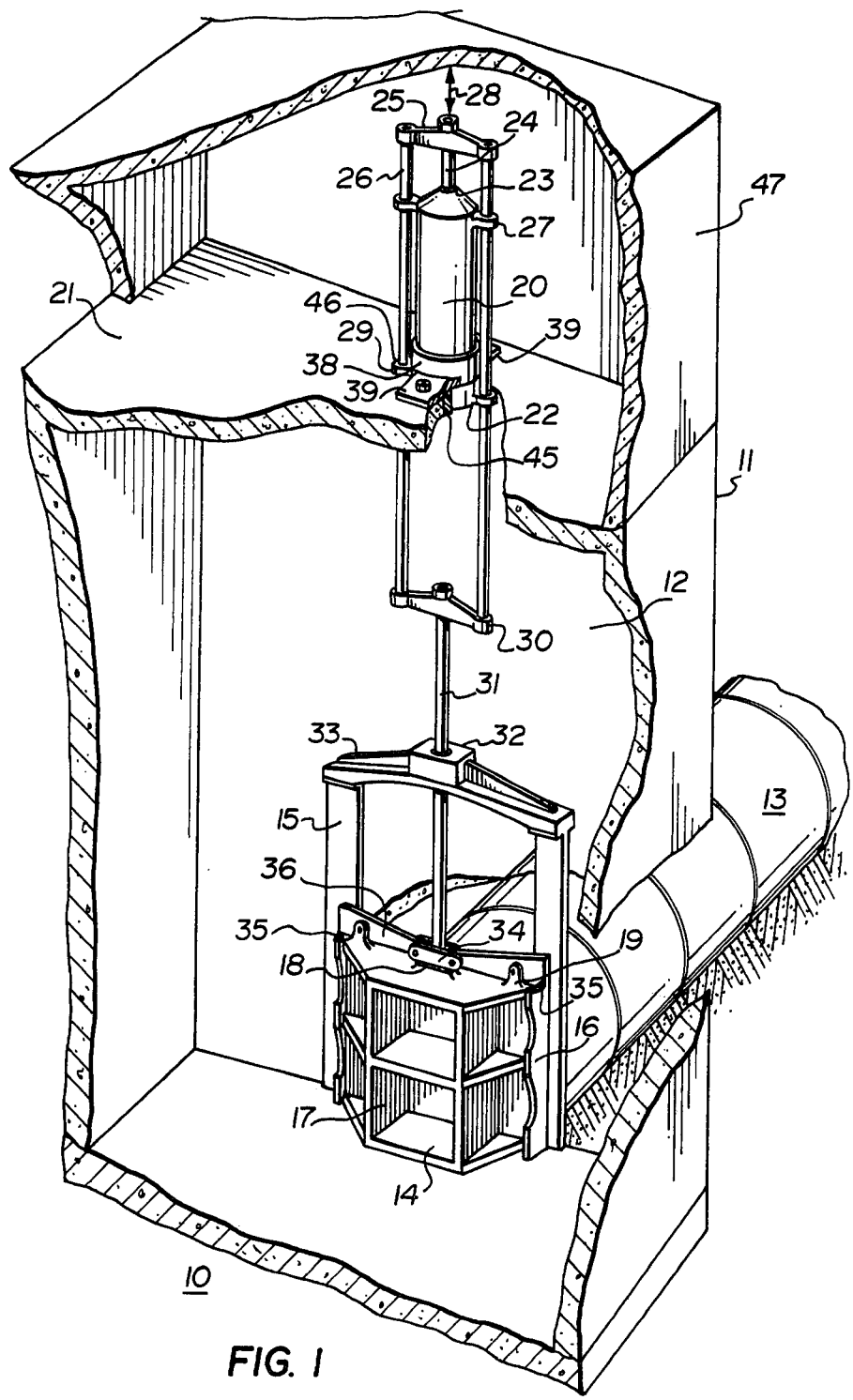
FIG. 1 is a perspective view of a sluice gate apparatus in accordance with the present invention.

A perspective view of a complete sluice gate apparatus 10 according to the invention is shown in FIG. 1. The embodiment illustrated is shown disposed at one end of a concrete settling tank 11 in a sewage treatment plant. An end wall 12 of the tank 11 includes a gate opening to which is coupled a sewer pipe 13. In the present system, effluent is conducted along the pipe 13 and its flow into the tank 11 through the gate opening is controlled by a gate disc 14.

The degree of effluent flow through the gate opening is determined by the disc 14 which is positionable vertically with the respect to the opening. It will be understood that the gate opening communicates the pipe 13 with the interior of the tank 11 at a position in the wall 12 which is directly behind the disc 14. Accordingly, it will be further understood that the disc 14 as shown is in its lowermost or closed position and forms a watertight seal across the gate opening in accordance with established practices.

Frame means comprising frame members 15 define the gate opening and, together with gate disc guides 16, are adapted to retain the disc 14 in slidable relation with respect to the opening.

In order to withstand hydraulic pressures that may be encountered from time to time the disc 14 is reinforced with gussets 17. This structural feature provides the necessary robjust features required and also provides a source of extra weight which assists in seating the disc 14 against the gate opening to provide a watertight seal. The manner in which a watertight seal is obtained will later be described. Although not clearly shown in FIG. 1, it will be understood by those knowledgeable in the art of sluice gate systems that the disc 14 and its guides 16 are provided with slidable tongue-and-groove joints to permit slidable movement therebetween while retaining the disc 14 in operable relation with the gate opening. Furthermore, although there is no detail in FIG. 1 showing the type of connection between the guides 16 and the members 15, it will be understood that any suitable form of fastener may be used and in fact each member 15 and its guide 16 could be formed as an integral unit.

A substantially flat uppermost surface of the disc 14 has formed thereon a central pedestal portion 18 flanked on either side by an upstanding "U" shaped bracket 19. The respective functions of these two structural features will be hereinafter described.

A system for drawing or lifting the disc 14 comprises a hydraulic cylinder 20 which is set and sealed in an overhead wall 21. Since the environmental conditions within the tank 11 are corrosive in nature, the cylinder 20 is shown positioned in the wall 21 with a closed end 22 facing inwardly of the tank and an open end 23 facing outwardly thereof into a closed chamber 47. A slidable piston (not shown) within the cylinder 20 is connected by means of its piston rod 24 to suitable means for operably connecting the disc 14 with the piston of the cylinder 20. A particular benefit of this arrangement provides that the rod 24 is disposed in a clean environment in the chamber 47. This extends the operating life of the rod 24 and minimizes the incidence of hydraulic leaks and other maintenance problems associated with the piston and cylinder.

Raising the disc 14 to open the gate requires the application, in a known manner, of hydraulic fluid (e.g. water) under pressure to the cylinder 20, forcing the piston therein in an upward direction. A consequent movement of the rod 24 raises a yoke or bracket 25 fastened thereto to which is connected a pair of tail rods 26 that are disposed alongside the cylinder 20 in diametrically opposed relation. Tail rod guides 27 form part of the cylinder 20 at opposite ends thereof and guide the rods 26 in the direction of a long axis of the cylinder 20 which is indicated by the double headed arrow 28.

It will be observed that the rods 26 depend downwardly from the bracket 25 and pass through passages 29 in the overhead wall 21 into the interior of the tank 11. The free ends of the rods 26 are joined by a tail rod yoke or bracket 30 to which is connected a stem 31.

The stem depends downwardly from the bracket 30 and is secured thereto with appropriate known fastening means. About midway along its length, the stem 31 is slidably supported by a stem guide 32 which forms part of a stem guide yoke 33 that is secured at respective ends thereof to uppermost portions of the frame members 15.

The lowermost end of the stem 31 terminates in a double-ended toggle link 34 which abuts the pedestal 18. In this way, when hydraulic pressure is suitably applied to the cylinder 20 to displace the disc 14 downwardly in order to close the gate opening, the downward pressure is applied via the stem 31 and the link 34 against the pedestal 18.

Figure 2:
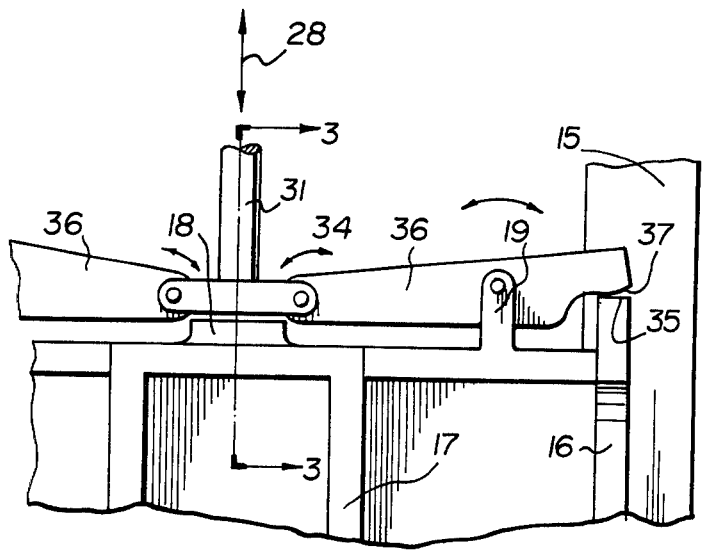
FIG. 2 is a front elevation view of a portion of the apparatus shown in FIG. 1.

Each end of the link 34 is pivotably connected to lever means illustrated in FIGS. 1 and 2 as a pair of levers 36. Each lever has long and short ends and a fulcrum therebetween that is pivotably connected to the bracket 19, the short end being disposed outwardly towards end portions 35 of the guides 16. When the disc 14 is in closed relation with the gate opening as illustrated in FIG. 1, the short ends will be seen to bear against the end portions 35 with the long ends being pivotably connected to the link 34.

An enlarged front elevation view of the foregoing structure is shown in FIG. 2. Since both levers 36 function identically, only one of the levers is fully shown in FIG. 2 to assist in explaining the operation of this aspect of the embodiment, other portions of the sluice gate apparatus being only partly shown to indicate their relative positions.

It will be apparent from FIGS. 1 and 2 that when the stem 31 is drawn upwardly along the long axis 28, each lever 36 pivots about its bracket 19, to which it is pivotably joined, and a curved surface 37 of the short end bears against the end portions 35. Depending upon the length ratio between the long and short ends, there is obtained a mechanical advantage in drawing pressure when displacing the disc from its closed position to a partially open position.

A mechanical advantage of the form described is required to achieve reduced energy consumption for operating the apparatus 10 when it is required to crack the seal between the disc 14 and its frame members 15. Even in those systems where the application of a force may not be limited by the drawing means employed it is, nevertheless, particularly desirable to conserve available energy. Reduced energy requirements thus make feasible the use of hydraulic drawing means which are energized by relatively low water pressure as may be found in a municipal water system. An additional benefit to be derived is the avoidance of system failure as a result of electrical power stoppages which would disable the system temporarily if the drawing means comprised an electric drive motor and suitable known means adapted to rotatably drive a threaded stem corresponding to the sliding stem 31 of FIG. 1. The possibility of disabling the apparatus 10 as a result of an electrical power failure is obviated, of course, since the cylinder 20 is adapted to function adequately on available water pressure which is present irrespective of electric power outages. Moreover, the advantages of the hydraulic apparatus forming part of the apparatus 10 provides reduced maintenance costs, and quietness of operation together with a wide range of operating speeds.

Referring again to FIG. 1, it will be observed that portions of the tank 11 are shown cut away to better illustrate the disposition of the cylinder 20 in the overhead wall 21 as well as the adjacent end wall 12 through which the pipe 13 enters to join the gate opening behind the disc 14. The means for connecting the pipe to the frame is not illustrated, nor is a description required since it does not form part of the present invention and, moreover, it is well documented in the literature of sluice gate systems.

In order to completely isolate the corrosion and wear-sensitive portions of the hydraulic cylinder 20, including the rod 24, the passages 29 would normally be provided with a known sliding seal to prevent the escape of corrosive vapours from the interior of the tank 11 into proximity with the open end 23. This leads to reduced maintenance problems and longer life of the hydraulics.

While FIG. 1 shows the cylinder 20 in an upstanding position, there may be occasions where the cylinder is required to be mounted horizontally on a bulkhead wall. The efficacy of the system illustrated and described is not altered by such a requirement and in fact is able to function with the cylinder positioned in any attitude. In this regard, the cylinder 20 may even be installed within the tank 11 together with the disc 14 although a preferred form of the embodiment has the cylinder extending outside the tank.

Figure 3:
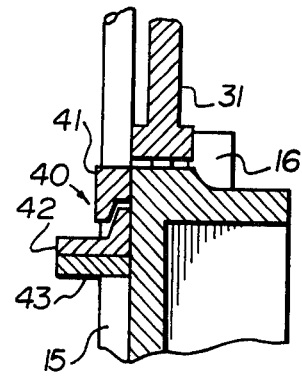
FIG. 3 is a cross sectional view of FIG. 2 taken along the lines 3—3.

FIG. 3 is a sectional view taken along the lines 3—3 of FIG. 2 and is presented herein as an illustrative arrangement of a top wedge 40 of a type that is known in the art. As shown in FIG. 3, the wedge 40 comprises an upper wedge member 41 which operates against a lower wedge member 42 that is fastened to a cross brace 43 intermediate the frame members 15. As the disc 14 approaches its lowermost limit of downward travel, the sloping mating surfaces of the members 41 and 42 contact slidably and force together corresponding sliding surfaces of the disc 14 and its members 15 to form a watertight seal. A somewhat similar arrangement may be used as a side wedge and as a bottom wedge but is not illustrated nor described herein since these structural features are known.

Figure 4:
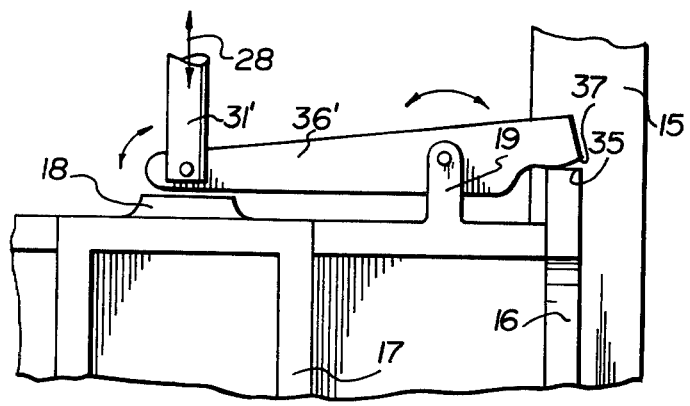
FIG. 4 is a front elevation view similar to the view of FIG. 2 and showing another embodiment of the invention.

Another embodiment of the invention may be seen in a partial front elevation view in FIG. 4. It will be readily observed that this apparatus follows the embodiment of FIG. 2 closely but has been simplified by the exclusion of one lever 36 together with the link 34. In place of the link, the lowermost end of the stem 31' has been slotted and drilled to accept the long end of the lever 36' which is pivotally mounted in the slotted portion. The operation of both embodiments is similar with the exception that the mechanical advantages provided by the apparatus of FIG. 4 is reduced in that it is applied to one side of the disc 14 rather than being applied equally to both sides as would occur with the embodiment illustrated in FIGS. 1 and 2. In some applications, however, the embodiment of FIG. 4 may be adequate. Particularly in an application where the disc 14, instead of being slidably mounted in a grooved frame or guide, is adapted to be mounted from a pivotal support. In such an application, a displacing force applied to the disc would be unsymetrically applied, meaning it is applied to one side only since the other side of the disc is pivotably mounted.

It has been disclosed that the chamber 47 provides a clean environment for the open end 23 of the cylinder 20. This condition is maintained by virtue of sliding elastomeric seals 46 in the passages 29 and a corresponding fixed seal 45 that is intermediate the cylinder 20 and the wall 21 in which the cylinder is fixedly set. Since the chamber 47 may have a short head space, a mounting stool or bracket 38 having side flanges 39 is positioned on the cylinder 20 and is then secured thereto in order to provide adequate head space for proper operation of the cylinder. In this event, more or less of the closed end 22 enters the tank 11. Suitable known means fasten the flanges 39 to the wall 21 which forms the floor of the chamber 47. The cylinder 20 is thus firmly set in the wall 21 and the seals 45 and 46 prevent entry of corrosive pollutants that may damage the rod 24.

Whereas the illustrated and described embodiments relate to a sewage treatment plant, it will be understood that like and similar embodiments may find equal application in drainage systems. In such instances the tank 11 may comprise merely a portion of a drainage conduit.

Having regard to the description and illustrations of the present invention, it will be apparent to those skilled in the art that variations thereof are within the scope of the invention and are readily feasible. Accordingly, the disclosed and illustrated embodiments herein should be considered as exemplary rather than restrictive of the invention which is defined in the accompanying claims.

What I claim is:

1. In a sluice gate apparatus including drawing means energizable to operate the apparatus, a gate disc adapted to open and close a gate opening, frame means defining the gate opening, including guide means adapted to retain the disc in slidable relation with respect to said opening, means connecting the disc with the drawing means for laterally displacing the disc relative to the opening when the drawing means are energized, said drawing means comprising a hydraulic cylinder having a long axis aligned with the connecting means, a closed end facing the disc and an open end facing away from the disc, a piston slidably disposed within the cylinder along said axis and a piston rod extending outwardly of the open end and connecting said piston to the connecting means, lever means having long and short ends and a fulcrum therebetween pivotably connected to the disc, the short end being disposed to bear against a fixed portion of at least one of the guide means and said frame when the disc is in closed relation with the opening, and the long end being connected to the connecting means to obtain a mechanical advantage in drawing pressure when displacing the disc to a partially open position, an improvement comprising a bulkhead isolating the open end from the disc, said bulkhead retaining the cylinder in fixed relation to the frame means and having walls defining at least one passage through which at least one tail rod of the connecting means is adapted to pass and sealing means for slidably sealing said at least one tail rod in said at least one passage.

2. In gate apparatus including drawing means energizable to operate the apparatus, a gate disc adapted to open and close a gate opening, frame means defining the gate opening, including guide means adapted to retain the disc in slidable relation with respect to said opening, and means connecting the disc with the drawing means for laterally displacing the disc relative to the opening when the drawing means are energized, an improvement in the drawing means comprising, a hydraulic cylinder having a long axis aligned with the connecting means, a closed end facing the disc, an open end facing away from the disc, a piston slidably disposed within the cylinder along said axis, a piston rod extending outwardly of the open end and connecting said piston to the connecting means, a bulkhead isolating the open end from the disc, said bulkhead retaining the cylinder in fixed relation to the frame means and having walls defining at least one passage through which at least one tail rod of the connecting means is adapted to pass and sealing means for slidably sealing said at least one tail rod in said at least one passage.

3. Sluice gate apparatus comprising:
a gate disc adapted to open and close a gate opening;
frame means defining the gate opening, including guide means adapted to retain the disc in slidable relation with respect to said opening;
means connecting the disc with drawing means for laterally displacing the disc relative to the opening when the drawing means are energized;

lever means having long and short ends and a fulcrum therebetween pivotably connected to the disc, the short end being disposed to bear against a fixed portion of at least one of the guide means and said frame means when the disc is in closed relation with the opening, and the long end being connected to the connecting means to obtain a mechanical advantage in drawing pressure when displacing the disc to a partially open position;

wedge means adapted to wedge the disc closed when said disc is in said closed relation;

drawing means including a hydraulic cylinder having a long axis aligned with the connecting means, a closed end facing the disc and an open end facing away from the disc, a piston slidably disposed within the cylinder along said axis and a piston rod extending outwardly of the open end and connecting said piston to the connecting means;

a bulkhead isolating the open end from the disc, said bulkhead retaining the cylinder in fixed relation to the frame means and having walls defining at least one passage through which at least one tail rod of the connecting means is adapted to pass; and sealing means for slidably sealing said at least one tail rod in said at least one passage.

4. Apparatus as claimed in claim 3 further comprising:

a pair of tail rods disposed alongside the cylinder in diametrically opposed relation;

rod guides secured to the cylinder at opposite ends thereof for guiding the tail rods in the direction of the long axis;

a first bracket securing corresponding first ends of the tail rods to the piston rod;

a stem disposed on the long axis adjacent the closed end of the cylinder; and a second bracket securing corresponding second ends of the tail rods to one end of said stem.

5. Apparatus as claimed in claim 4 wherein the lever means comprise a single lever with the long end being pivotably connected to the free end of the stem.

6. Apparatus as claimed in claim 4 wherein the lever means comprise a pair of levers, the apparatus further comprising a toggle link fixed to the free end of the stem and pivotably connected to the long end of each lever.

7. Apparatus as claimed in claim 6 wherein the bulkhead comprises an overhead wall of a chamber, said chamber having an adjacent wall that includes the gate opening and said adjacent wall being adapted to mount the frame means.

* * * * *